(12) United States Patent
Hu (10) Patent No.: US 6,262,970 B1
(45) Date of Patent: Jul. 17, 2001

(54) AIR BEARING SURFACE DESIGN FOR GLIDE TESTING OF PLASTIC MEDIA

(75) Inventor: Yong Hu, Fremont, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/271,109

(22) Filed: Mar. 17, 1999

(51) Int. Cl.[7] .......................... G11B 21/21; G11B 17/32; G11B 5/60
(52) U.S. Cl. .......................... 369/300; 360/236.6
(58) Field of Search .............. 360/234.3, 235.4, 360/236.6; 369/300

(56) References Cited

U.S. PATENT DOCUMENTS

| | | | |
|---|---|---|---|
| 4,633,450 | 12/1986 | Gueugnon | 369/13 |
| 4,757,402 * | 7/1988 | Mo | 360/103 |
| 4,870,519 * | 9/1989 | White | 360/103 |
| 4,893,207 | 1/1990 | Maury et al. | 360/114 |
| 5,020,041 * | 5/1991 | Nakao et al. | 369/13 |
| 5,086,360 * | 2/1992 | Smith et al. | 360/103 |
| 5,097,370 * | 3/1992 | Hsia | 360/103 |
| 5,202,863 * | 4/1993 | Miyatake et al. | 369/13 |
| 5,237,548 * | 8/1993 | Muchnik | 369/13 |
| 5,636,085 * | 6/1997 | Jones et al. | 360/103 |
| 5,677,812 | 10/1997 | Cha | 360/103 |
| 5,872,685 * | 2/1999 | Park et al. | 360/103 |
| 5,889,641 * | 3/1999 | Belser et al. | 360/113 |
| 5,917,679 * | 6/1999 | Park et al. | 360/103 |
| 5,940,249 * | 8/1999 | Hendriks | 360/103 |
| 5,953,181 * | 9/1999 | Utsunomiya | 360/103 |
| 6,058,094 * | 5/2000 | Davis et al. | 369/112 |
| 6,115,329 * | 9/2000 | Hu | 369/13 |
| 6,144,528 * | 11/2000 | Anaya-Dufresne et al. | 360/235.4 |

FOREIGN PATENT DOCUMENTS

| | | |
|---|---|---|
| 0 518 566 | 12/1992 | (EP). |
| 0 652 552 | 5/1995 | (EP). |
| 61-057087 * | 3/1986 | (JP). |
| 61-273784 * | 12/1986 | (JP). |
| 63-224087 * | 9/1988 | (JP). |
| 63-255883 * | 10/1988 | (JP). |
| 63-298879 * | 12/1988 | (JP). |
| 3-248380 * | 11/1991 | (JP). |
| 4-069875 * | 3/1992 | (JP). |
| 08 273183 | 10/1996 | (JP). |
| 9-147340 * | 6/1997 | (JP). |

* cited by examiner

Primary Examiner—William Klimowicz
(74) Attorney, Agent, or Firm—Thomason, Moser & Patterson, LLP (57) ABSTRACT

A slider which utilizes a set of four pads arranged in a generally rectangular form. The two pads on the leading edge of the slider each include an angled face on their leading edge to facilitate the lift-off of the slider. Behind each leading edge pad is a trailing pad of substantially the same width and separated from the leading pad by a cross-cut channel. The pressure relief provided by the open cross-slot that separates the front and rear pads of each rail of the slider significantly reduces the sensitivity of air bearing pressure to the shape of the disc surface, leading to a very small fly height modulation even when moving over a disc with substantial runout. The rails are separated by a cross-cut. This cross-cut design substantially diminishes the effect of pressure variations which occur owing to the peaks and valleys which exist on discs, especially plastic discs as the slider flies over the surface of the disc.

12 Claims, 15 Drawing Sheets

Cross-Cut

FIG. 1
Twin-Rail

FIG. 5
Cross-Cut

Disc Runout Amplitude (peak-to-peak, μm)
Effects of Runout on Min FH @ID

3D Air Bearing Pressure (ID): Cross-Cut Design
Flying over the valley of the disc runout (amplitude = 120 μm, 150 Hz)

FIG. 15

AIR BEARING SURFACE DESIGN FOR GLIDE TESTING OF PLASTIC MEDIA

FIELD OF THE INVENTION

The present invention relates to disc drive storage systems, and more particularly to an improved air bearing slider for use with a rotary actuator in a disc drive.

BACKGROUND OF THE INVENTION

Information storage technology and the storage capacity available therefrom has been historically limited by a number of factors. A typical prior art Winchester magnetic storage system includes a magnetic head that has a slider element and a magnetic read/write element and is coupled to a rotary actuator magnet and coil assembly by a suspension actuator arm so as to be positioned over the surface of a spinning magnetic disc. In operation, lift forces are generated by aerodynamic interaction between the magnetic head and the spinning magnetic disc. The lift forces are opposed by spring forces applied by the suspension so that a predetermined flying height is hopefully maintained over a full radial stroke of the radial actuator assembly above the surface of the spinning magnetic disc. Such conventional magnetic heads are constrained by the theoretical limit on the ability to closely pack adjacent magnetic bits on the disc surface and still accurately recover and read each bit of information.

To address this problem, much research is being done in the development of magneto-optical (MO) storage technology which provides a higher areal density. During conventional writing of information in MO disc drives, an incident laser beam heats a selected spot of interest on the MO disc to approximately the Curie point. A time varying vertical bias magnetic field is used to define a pattern of "up" or "down" magnetic domains in a recording layer. Subsequently, as the selected spot of interest cools, information is recorded on the MO disc. The size of the magnetic field that is generated provides a lower limit on a maximum data density that may be recorded on the MO disc. Information access in the MO storage system in turn is limited by the size of the optical spot to which an incident laser beam may be focused on the disc surface. Magneto-optical information access requires the use of polarized laser light for reading and writing information on an MO disc. To read information, MO technology makes use of a magneto-optical effect (Kerr effect). To detect a modulation of polarization rotation imposed on the linearly polarized incident laser beam by the recorded domain marks in the recording layer. The polarization rotation (representing the information stored at recorded marks or in the edges of the recorded marks) is embodied in a reflection of the linearly polarized laser beam and is converted by optics and electronics for readout.

It is apparent that an important factor in the ability to accurately read and write information from an MO disc, as well as to rapidly access different storage tracks on the MO disc is the design of the flying head, which carries the various components required for accessing magneto-optical information. The need to carry an optical assembly and a magnetic coil on the flying head has made its physical size and mass rather bulky. Therefore, it is somewhat difficult to provide a head which flies at a constant height over the surface of the plastic disc that typically has large runout/waviness. This is because the slider, which is the primary part of the flying head which controls the flying characteristics, typically includes a pair of side rails which are positioned along its side edges and are disposed about a recessed area. These side rails form a pair of air bearing surfaces. As the disc rotates, the disc drags air under the slider and along the air bearing surfaces in a direction approximately parallel to the tangential velocity of the disc. As the air passes beneath the side rails, the compression by the air bearing surfaces causes air pressure between the disc and the air bearing surfaces to increase, which creates a hydrodynamic lifting force that causes the slider to lift and fly above the disc surface. The changing surface curvature associated with the runout surface will exert a varying hydrodynamic lifting force to the slider, modulating its fly height. In general, the longer rails will result in larger fly height modulation.

Figure 1:
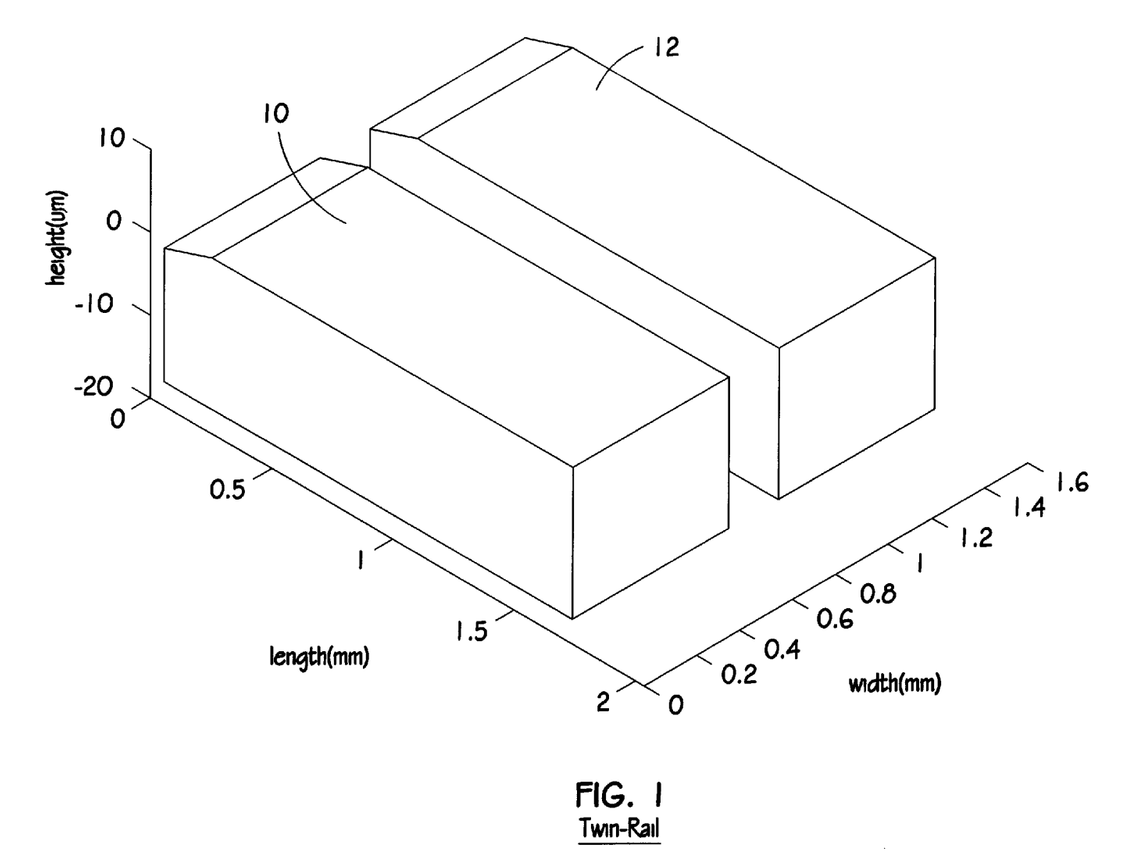
FIG. 1 is a perspective view of a prior art twin rail glide head design.

A related problem in establishing the glide height of a plastic disc which is especially unique to a magneto-optical disc drive is that a rotating plastic disc intrinsically exhibits larger runout/vibration than aluminum discs as long established in magnetic disc drives; this runout or vibration modulates the flight characteristics of the glide testing slider, making it difficult to reliably establish the true glide height of a plastic disc. Further, the excessive fly height fluctuation will frequently result in head disc contact and movement of the head out of optical focus. Finally, the fly head modulation introduces very unacceptable variations in the glide testing results. All of these difficulties occur with the typical catamaran ABS such as shown in FIG. 1 having twin rails 10, 12 which, it has been determined, is not the optimal design for achieving smooth disc runout/vibration following performance. Thus, a slider design which is relatively insensitive to fly height modulation characteristics to disc runout/vibration is highly desirable.

SUMMARY OF THE INVENTION

Therefore, a basic object of the invention is to provide a glide head air bearing design which has improved utility for glide testing plastic media.

A further objective of the invention is to provide an air bearing slider (ABS) which has improved access to the data stored in a disc storage system by achieving a smooth disc following performance.

A related objective of the invention is to provide an air bearing slider which is especially useful in glide testing or data access in a magneto-optical storage system.

Yet another objective of the invention is to provide an air bearing slider which is relatively insensitive to disc runout and vibration in its glide height test characteristics.

A related objective of the invention is to provide an air bearing slider which has reduced sensitivity to fly height modulation to disc runout/vibration, while retaining real shape simplicity for ease of fabrication.

Yet another objective of the invention is to provide an air bearing slider which can be implemented in a glide height design for testing plastic media.

These and other objectives for the air bearing slider design are achieved by utilizing a slider which rather than using the two longitudinal rails of the prior art utilize a set of four pads arranged in a generally rectangular form. The two pads on the leading edge of the slider each include an angled face on their leading edge to facilitate the liftoff of the slider. Behind each leading edge pad is a trailing pad of substantially the same width and separated from the leading pad by a cross-cut channel. The pressure relief provided by the open cross-slot that separates the front and rear pads of each rail of the slider significantly reduces the sensitivity of air bearing pressure to the shape of the disc surface, leading to a very small fly height modulation even when moving over a disc with substantial runout.

In a preferred form, each rail, now formed of a first leading pad and a second trailing pad separated by a cross-cut. This cross-cut design substantially diminishes the effect of pressure variations which occur owing to the peaks and valleys which exist on discs, especially plastic discs as the slider flies over the surface of the disc.

Other features and advantages of the present invention will be better understood by reference to the following figures and the detailed description of an exemplary embodiment given below in conjunction with these figures.

DETAILED DESCRIPTION OF A PREFERRED EMBODIMENT

Figure 2:
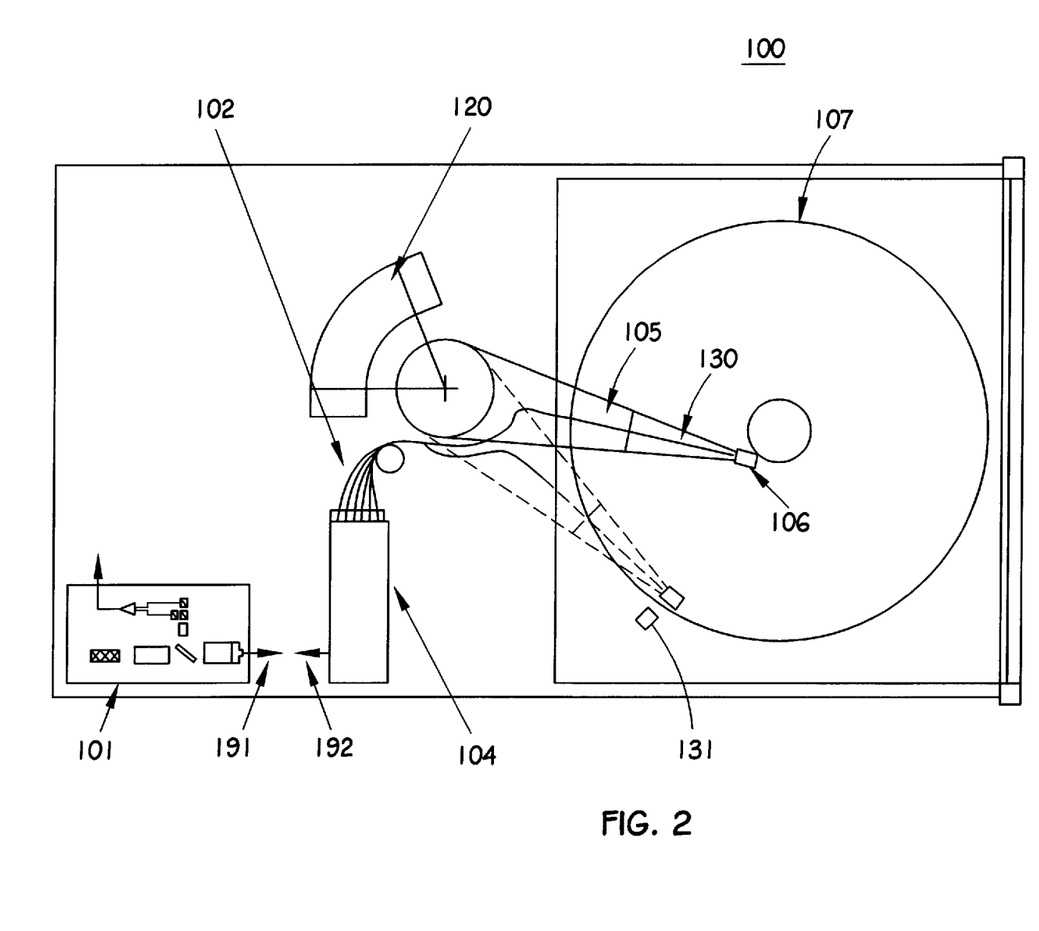
FIG. 2 is a plane view of a magneto-optical data storage system in which the present invention is useful.

Referring now in detail to the drawings, wherein similar parts of the invention are identified by like reference numerals, there is seen in FIG. 2 a plan view showing a typical magneto-optical data storage and retrieval system in which the present invention is useful. Of course, the slider disclosed and discussed below is not limited to use in such a magneto-optical storage system; indeed, the slider has utility in conventional magnetic disc drive storage systems, if properly scaled for the flying heights desired in such systems.

The embodiment of FIG. 2 shows a magneto-optical (MO) data storage and retrieval system 100 which includes a set of Winchester-type flying heads 106 that are adapted for use with a set of double sided MO discs 107. The set of flying heads 106 which are carried on the slider which is the subject of this invention are coupled to a rotary actuator magnet and coil assembly 120 by a suspension 130 and an actuator arm 105 to be positioned over the surfaces of the set of MO discs 107. In operation, the MO discs 107 are rotated by a spindle motor to generate aerodynamic lift forces between the sets of flying MO heads 106 and the disc surface, and to maintain the head in a flying condition above the upper and lower surfaces of the discs 107. The lift forces are opposed by equal and opposite spring forces applied by suspensions 130 as is well known in this technology. During non-operation, the MO heads are maintained statically in a storage condition away from the surfaces of the discs 107; they may rest in a landing zone at the ID of the disc surface, or on a ramp 131 which typically is at the OD of the disc surface.

System 100 further includes a laser optic assembly 101, an optical switch 104, and a set of single mode PM (polarization maintaining) optical fibers 102. In the exemplary embodiment, each of the set of single mode PM optical fibers 102 are coupled through a respective one of the set of actuator arms 105 and suspension 130 to a respective one of the set of flying MO heads 106.

Figure 3:
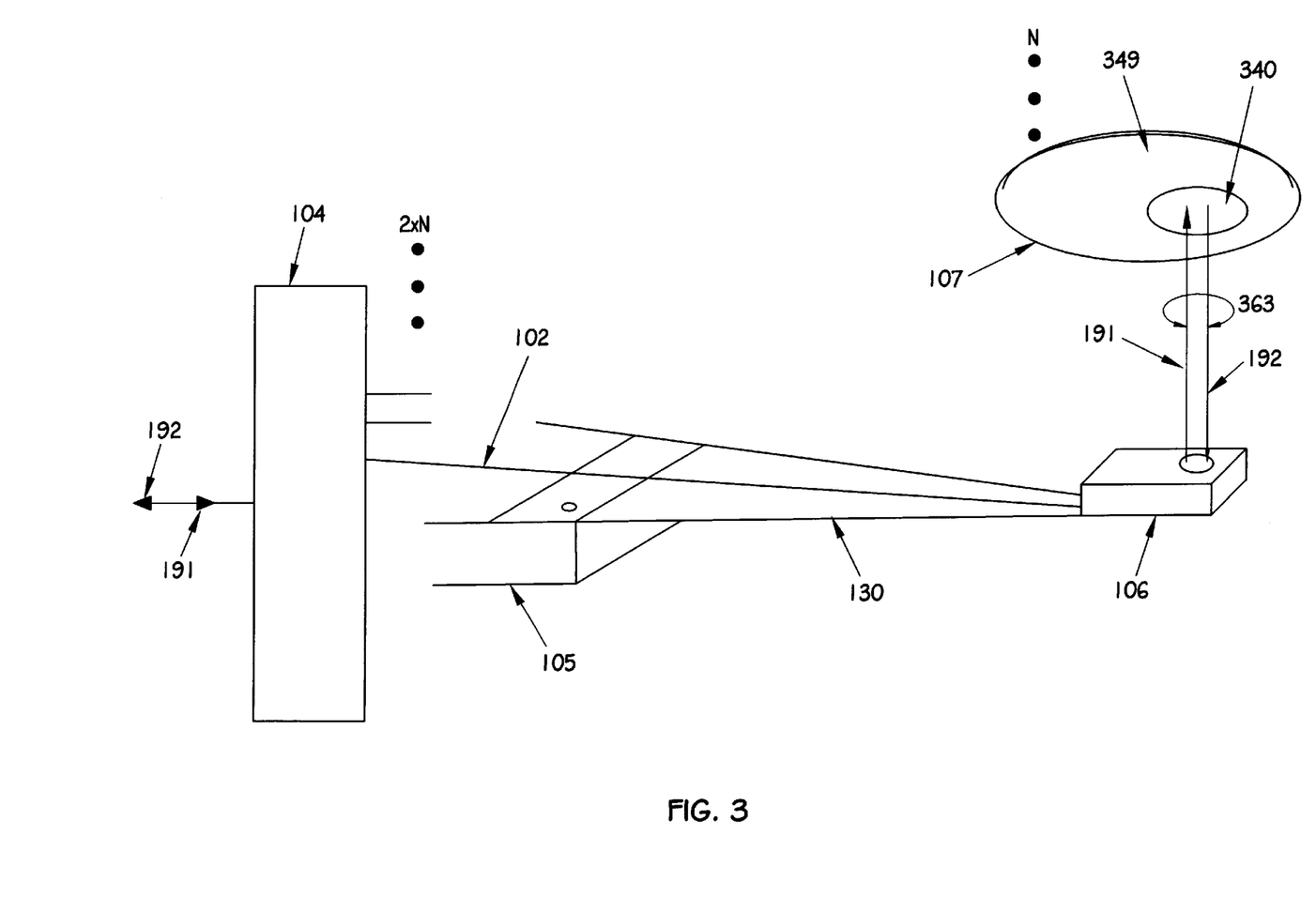
FIG. 3 is a diagram showing in simplified form a representative optical path using an optical fiber which is supported on the suspension to reach one of the flying MO heads in the system of FIG. 2.

FIG. 3 is a diagram showing in very simplified form a representative optical path utilizing a optical fiber 102 which is supported on the suspension 130 to reach one of the flying MO heads 106. An optical switch 104 provides for directing an outgoing laser beam 191 toward a respective proximal end of the PM optical fiber 102. The outgoing laser beam 191 is directed by the optical fiber 102 to exit at a respective distal end to pass through the flying MO head 106 onto a recording storage layer of a disc 107 associated with the flying head. Other details of the reading and writing operation associated with this optical fiber and optical switch may be found in an application entitled "MAXIMUM DATA STORAGE FOR MAGNETO-OPTICAL SYSTEM", U.S. Ser. No. 08/844,208 filed Apr. 18, 1997, assigned to the Assignee of the present invention and incorporated herein by reference. The above FIGS. 2 and 3 are provided to illustrate the importance of quickly moving the flying head 106 to a selected position over the surface of the associated disc 107 and maintaining that head at a stable position and at a stable height over the surface of the disc while information is written to and read from the surface of the disc. The use of this slider is clearly not limited to any single configuration of head, arm and disc.

Figure 4:
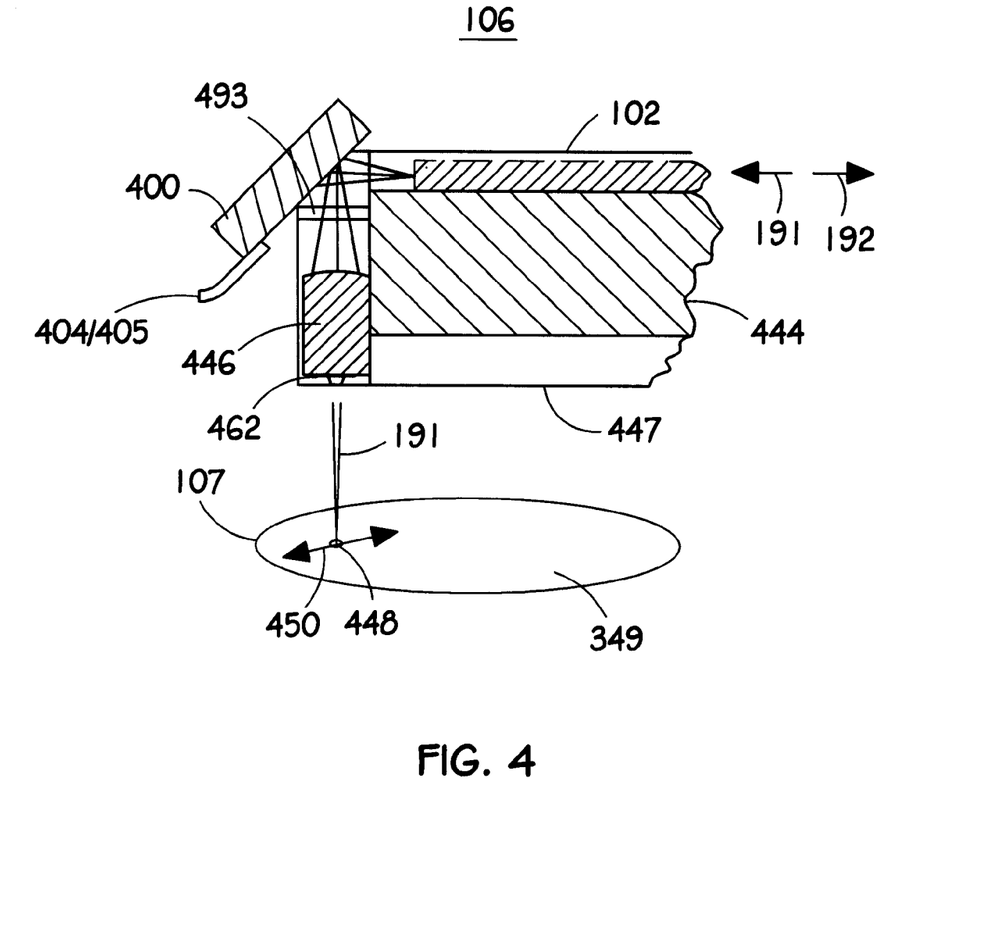
FIG. 4 is a vertical sectional view of the basic elements of a flying magneto-optical head supported on a slider for use in an MO data storage system.

FIG. 4 is a vertical sectional view of the basic elements of a flying magneto-optical head of an MO data storage system, the head being of a type generally speaking which would be supported by the slider of this invention. The flying head 106 is shown for use above a recording storage layer 349 of one MO disc 107. The MO head 106 includes in part a slider body 444 having an air bearing surface 447; a quarter waveplate 493, a reflective substrate 400 and objective optics 446 which are used to focus the light beam on the surface of the disc; and a magnetic coil 460 and a yoke 462 which are used to establish the magnetic field which is necessary for accessing data on the disc surface. The slider body 444 is dimensioned to establish the working distance between the objective optics, the optical fiber 102 and the reflective substrate 400. The reflective substrate 400 may also include a reflective surface which is aligned by electrodes 404, 405 to direct the outgoing laser beams 191 to and from the storage layer 349. It is apparent from a review of this figure that the slider must be capable of carrying a substantial amount of structure and supporting it in a stable fashion over the surface of the disc. It is for this reason that the slider body of this invention shown in the succeeding figures has been designed and adopted.

Figure 5:
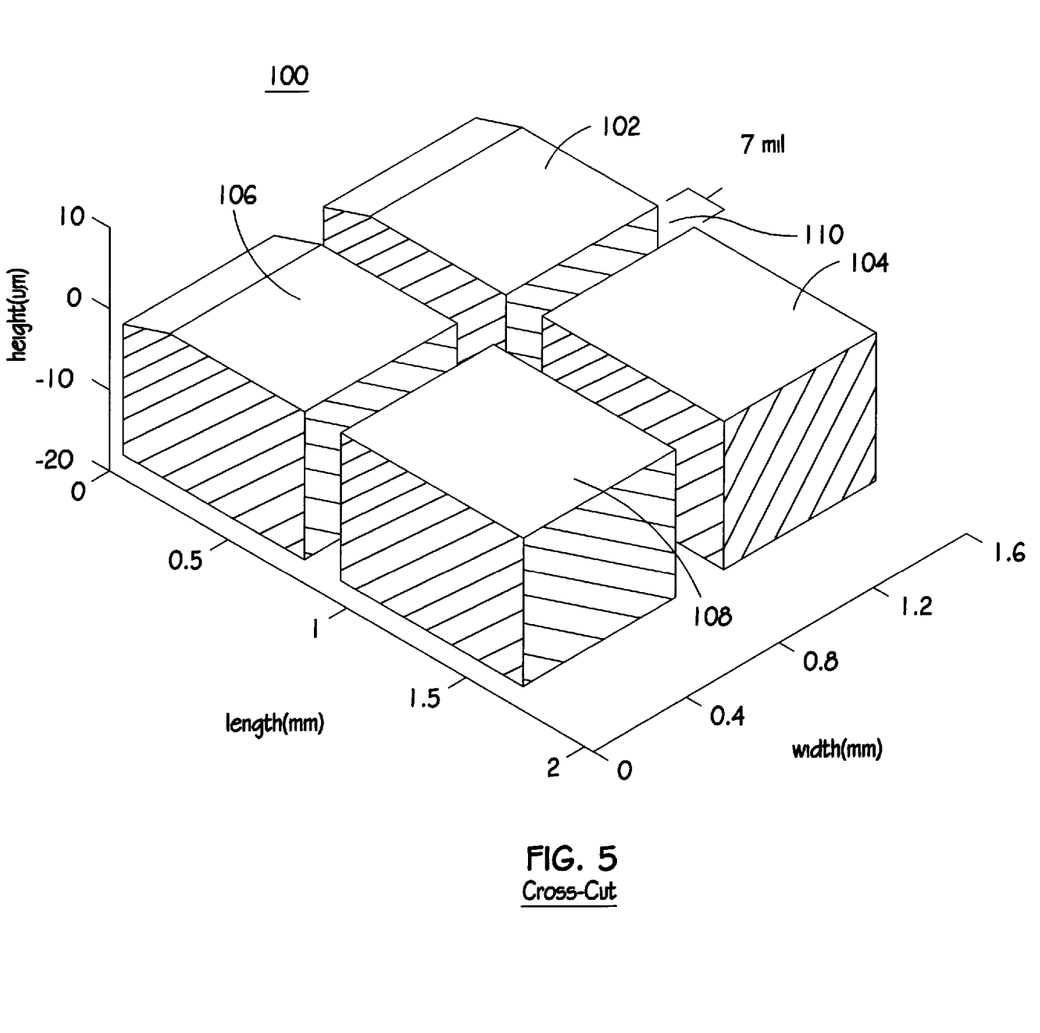
FIG. 5 is a perspective view of the glide head or slider of the present invention.

FIG. 5 is a perspective view of the slider or glide head constructed in accordance with this invention with the objective of significantly reducing the fly height modulation when flying over the plastic disc that has large runout/waviness. The prior art slider or glide head comprised two long parallel rails as shown in FIG. 1. The inventor has concluded that rail length is dominant factor in fly height modulation. By fly height modulation is meant the changes in distance from the glide head to the surface of the disc as the head flies over peaks and valleys of the disc which occur with disc runout. Therefore, as shown in FIG. 5, the two long rails are divided into four short pads 102, 104, 106, 108. The front pads 102, 106 are separated from the rear pads 104, 108 by a cross-cut slot 110. In typical dimensions, the width of the pad, i.e., in the radial direction of the pads relative to the disc over which the glide head flies is about 0.6 mm with a gap of about 0.4 mm. The cross-cut section 10 is about 7 mils, although it might be greater or less than this to enhance the effects to be discussed below. By utilizing this new four-pad design 100, the effective rail length of each of the two rails is greatly reduced, resulting in a dramatic improvement in the disc runout following performance.

Figure 6A:
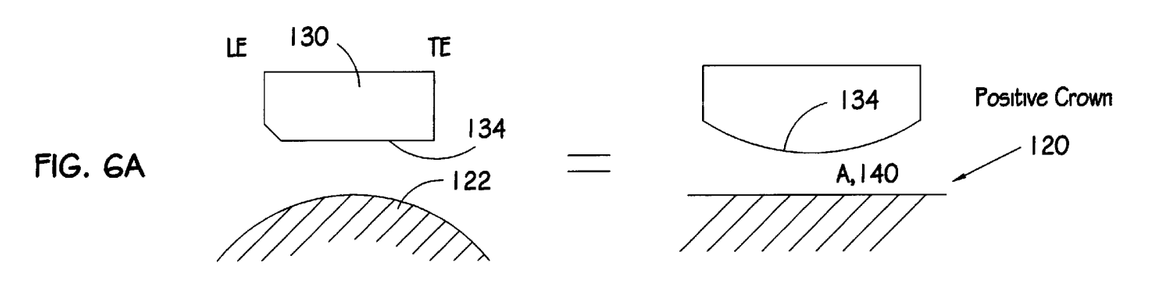
FIGS. 6A and 6B are diagrammatic views of the effects of positive crown and negative crown on pressure generation as a slider flies over the surface of a disc.
Figure 6B:
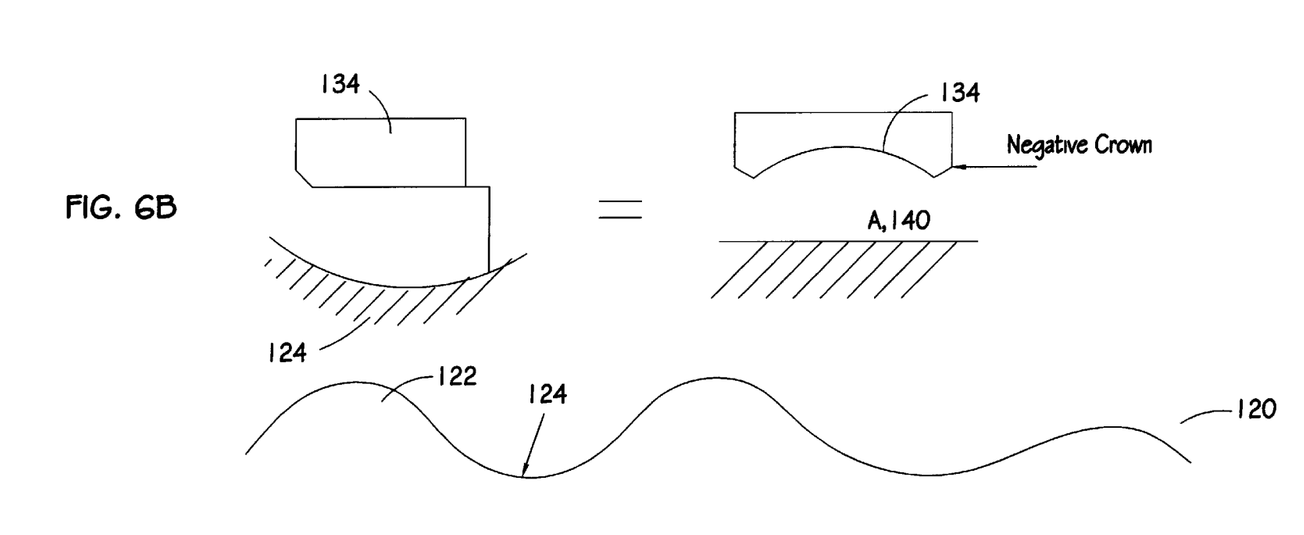

Flight height fluctuation is directly related to how strongly the changing disc surface curvature affects the air bearing pressure generation, especially in the central ABS region where the cross-cut gap 110 can be found. The phenomenon can be better understood by referring to FIGS. 6A and 6B which give a graphical representation of the effects on the fly height of the slider or glide head as it flies over the surface of a disc 120 which, due to disc runout, is characterized by occasional peaks 122 and valleys 124. The problem which occurs with the prior art design shown in FIG. 1 is that as the slider 130 flies over a positive crown 122, increased pressure is generated between the bottom surface 134 of the head 130 and the disc peak 122. This may be represented as seen to the right of FIG. 6A as the bottom surface 134 being effectively bowed out toward the disc 120 with the result as can plainly be seen that there would be an increase of pressure between the slider 130 and the disc surface 120 especially in the center region A,140. This increased pressure would, of course, result in the slider immediately moving further away from the surface of the disc. In contrast, where a negative crown phenomenon occurs as shown in FIG. 6B, at a depressed region 124, the slider 130 now can be represented as having a negative crown in the central region, causing a depression in the pressure in the region 140. This will cause the slider to move closer to the surface of the disc. It is apparent that although the slider is attempting to follow the surface of the disc, in fact movements over peaks 122 and valleys 124 are constantly exaggerating the movement of the slider 130 relative to the surface, making the head far too sensitive to changes in the disc surface. As will be shown in the following drawings, and charts of glide head performance, the pressure relief by the open cross-slot 110 in the present invention that separates the front and rear pads significantly reduces the sensitivity of air bearing pressure to the shape of the disc surface, leading to a very small fly height modulation. Thus, this ABS design offers superior disc runout/vibration following performance while retaining rail shape simplicity; the invention can be implemented in a glide head as well to improve the consistency of glide testing results.

Figure 7:
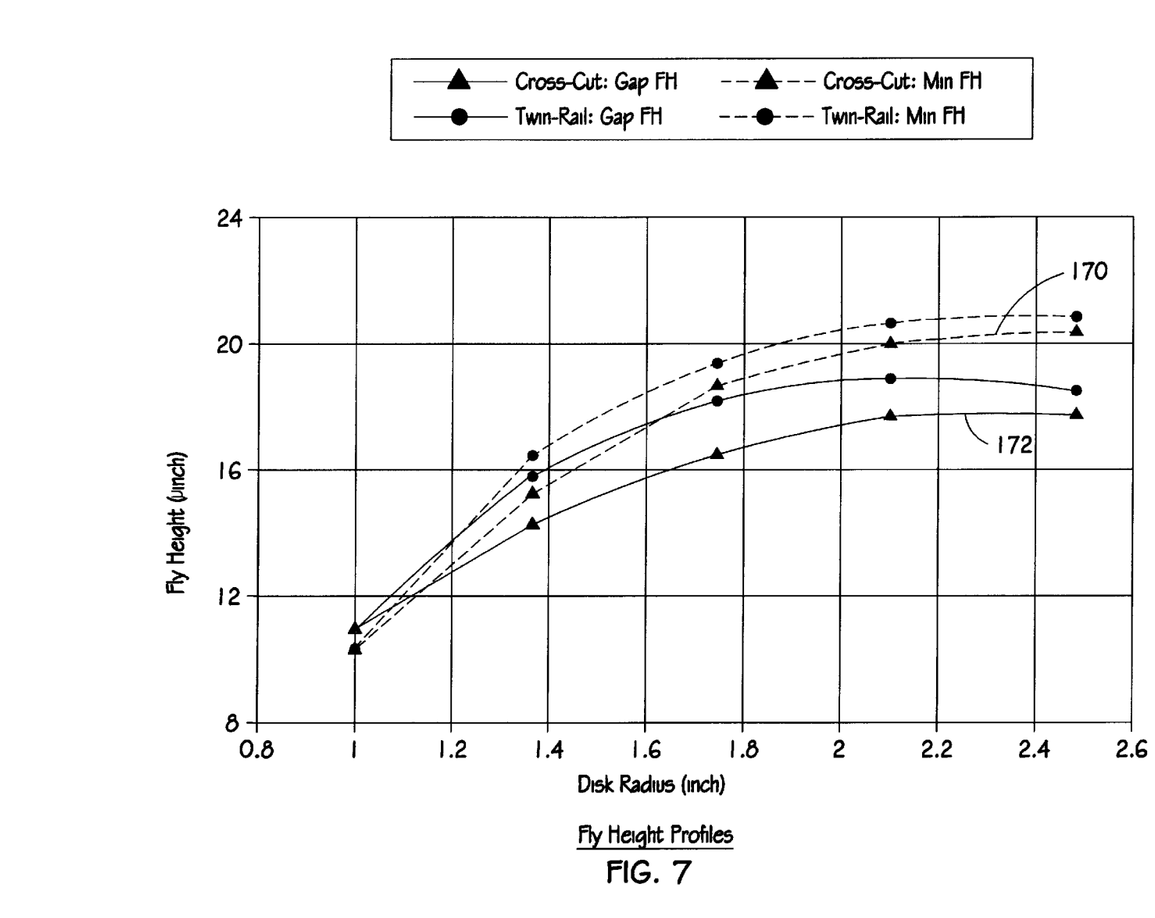
FIG. 7 illustrates fly height profiles of the prior art glide head and the glide head of the present invention.
Figure 8A:
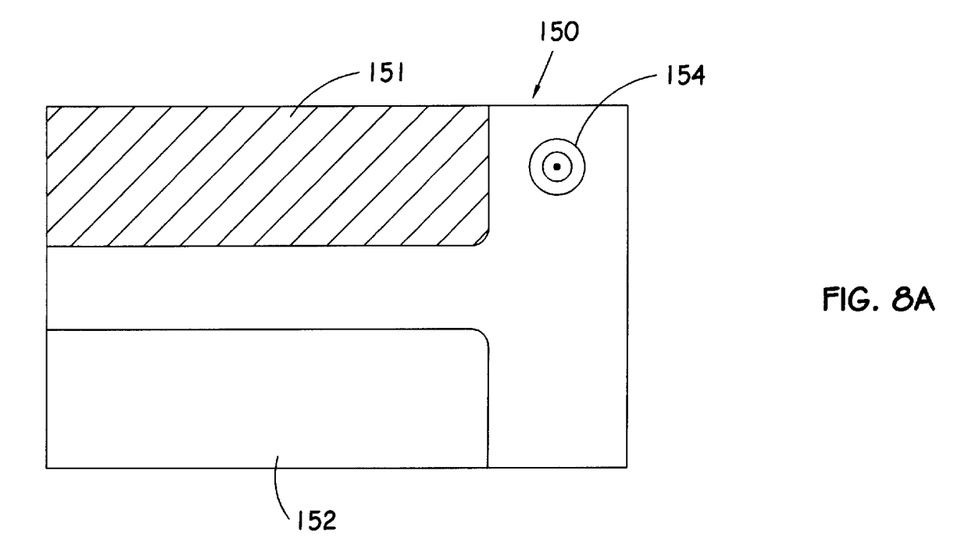
FIGS. 8A and 8B illustrate a typical slider and the measurement points for MIN FH and GAP FH.
Figure 8B:
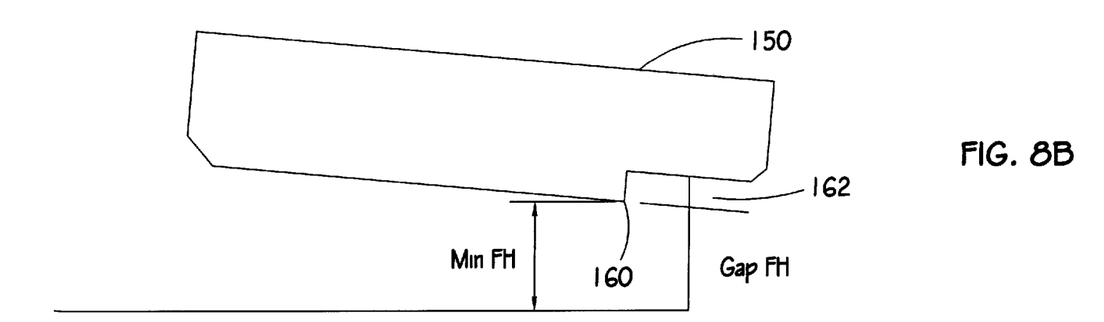

For example, FIG. 7 illustrates how much closer the closest point of the slider as well as the transducer gap of the transducer mounted on the slider are to the disc surface with the present invention rather than the prior art. The meaning of the terms "MIN FH" (minimum fly height) and "GAP FIT" (gap fly height) becomes more apparent from a review of FIGS. 8A and 8B. FIG. 8A shows the bottom of a typical twin rail slider 150 which includes two rails 151, 152 mounting a transducer 154 behind the trailing edge of one of the rails. Looking at the side of the same slider 150, it can then be seen that MIN FH is measured from the point of the slider which is closest to the gap surface, while GAP FH is measured from a point 162 which is the location of the transducer gap over the surface during normal flying conditions. Thus returning again to FIG. 7, it can be seen that the fly height for both the GAP FH and MIN FH 170, 172 are lower than with the prior art design.

Figure 9:
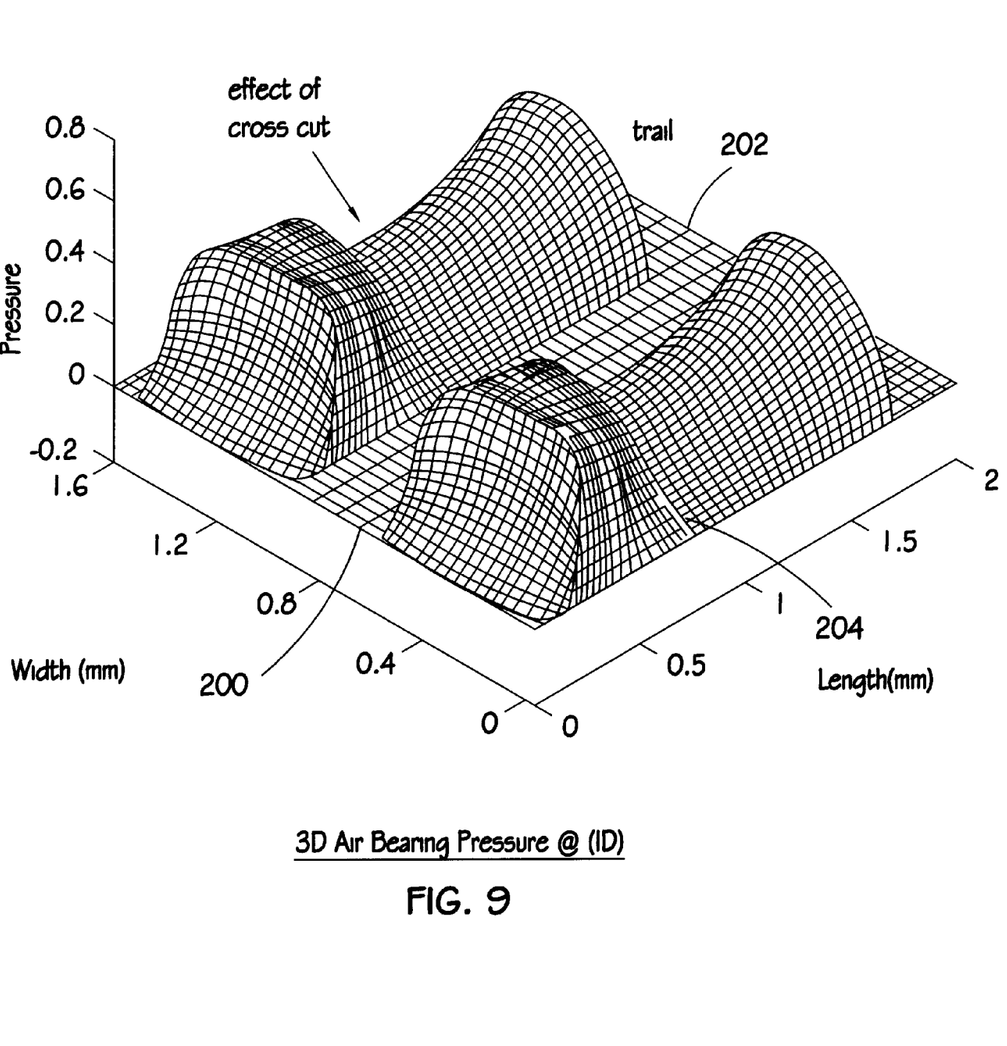
FIG. 9 is a 3D air bearing pressure profile of the present invention.

FIG. 9 is a graphical representation of the pressure variations across the lower surface of the slider incorporating the cross-cut improvement to the air bearing with the leading edge 200, the trailing edge 202, and the cross-cut gap region 204 being clearly represented. The lack of pressure in the cross-cut region means that in the region which is normally most affected by disc runout, there is little pressure variation to be affected so that the fly height modulation is minimized.

Figure 10:
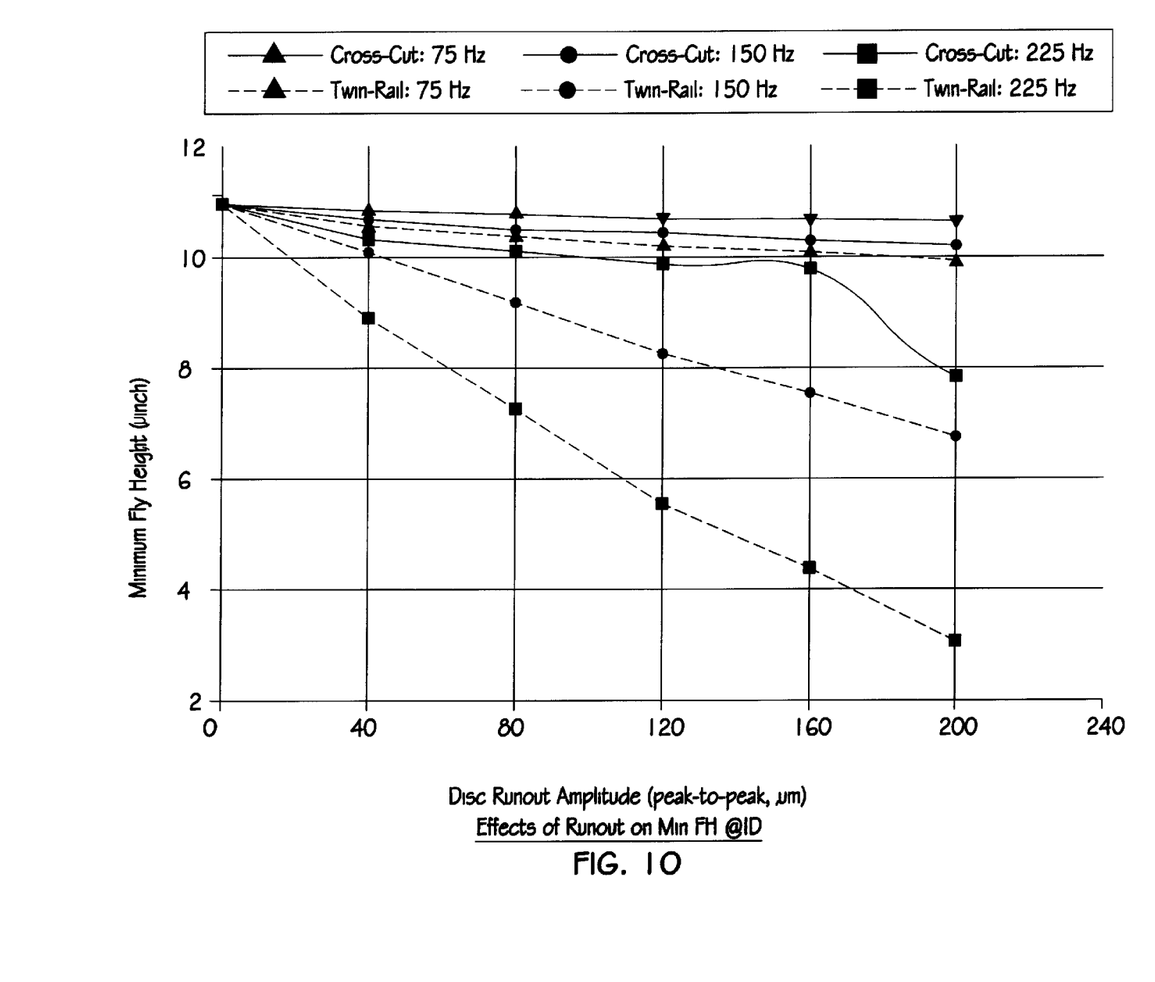
FIG. 10 graphs the effects of runout on MIN FH utilizing the present invention and the known prior art.
Figure 11:
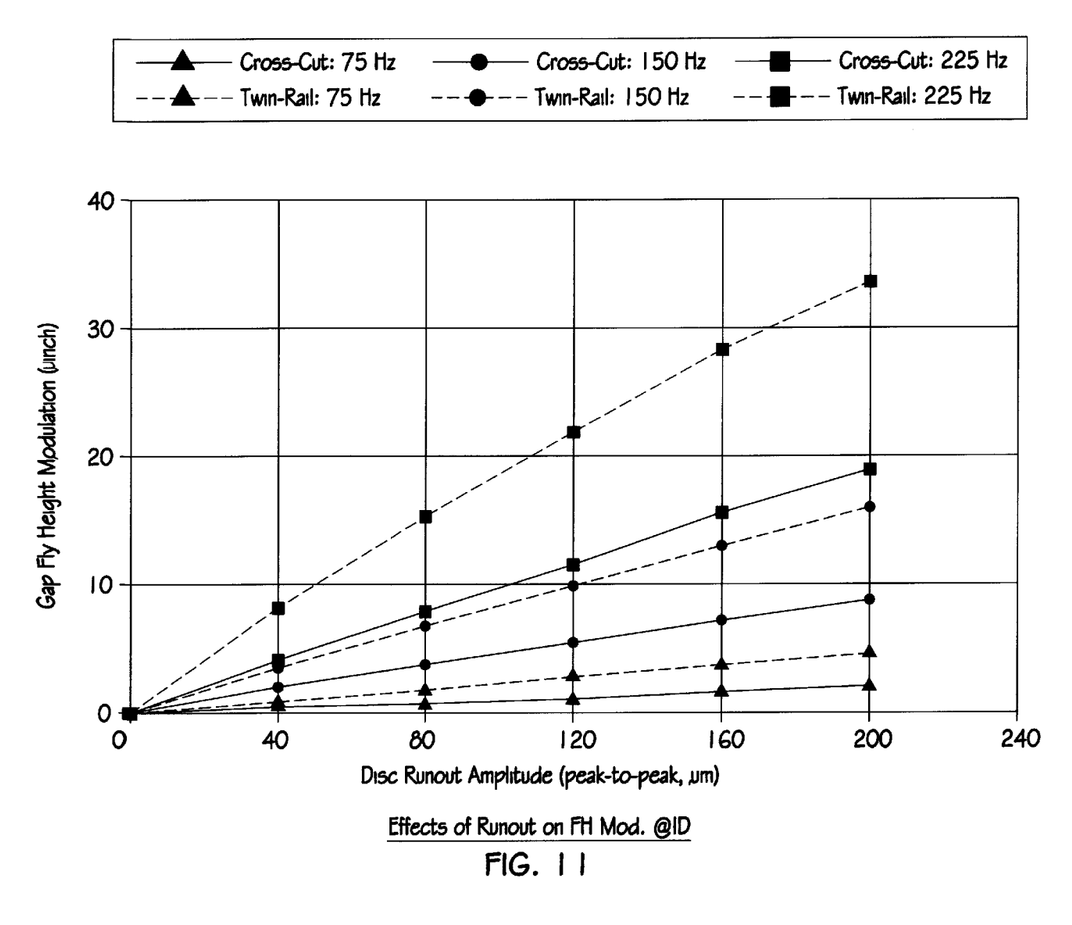
FIG. 11 illustrates the effects of runout on fly height modulation for the prior art and the present invention.
Figure 12:
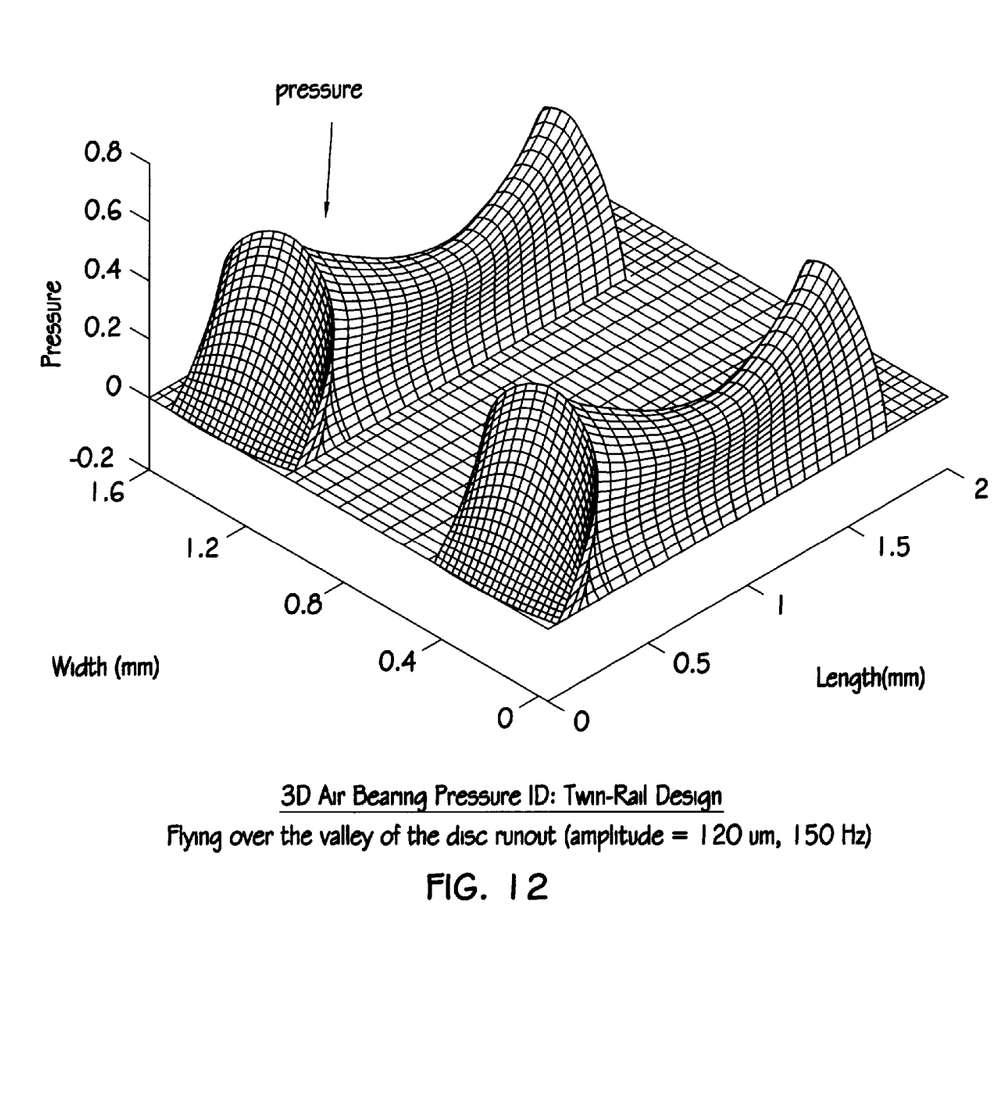
FIGS. 12 and 13 illustrate an air bearing pressure profile for the twin rail prior art design flying over the valley (FIG. 12) and over the peak (FIG. 13) of the disc runout for an amplitude of 120 micron meters and a frequency of 150 Hz.
Figure 13:
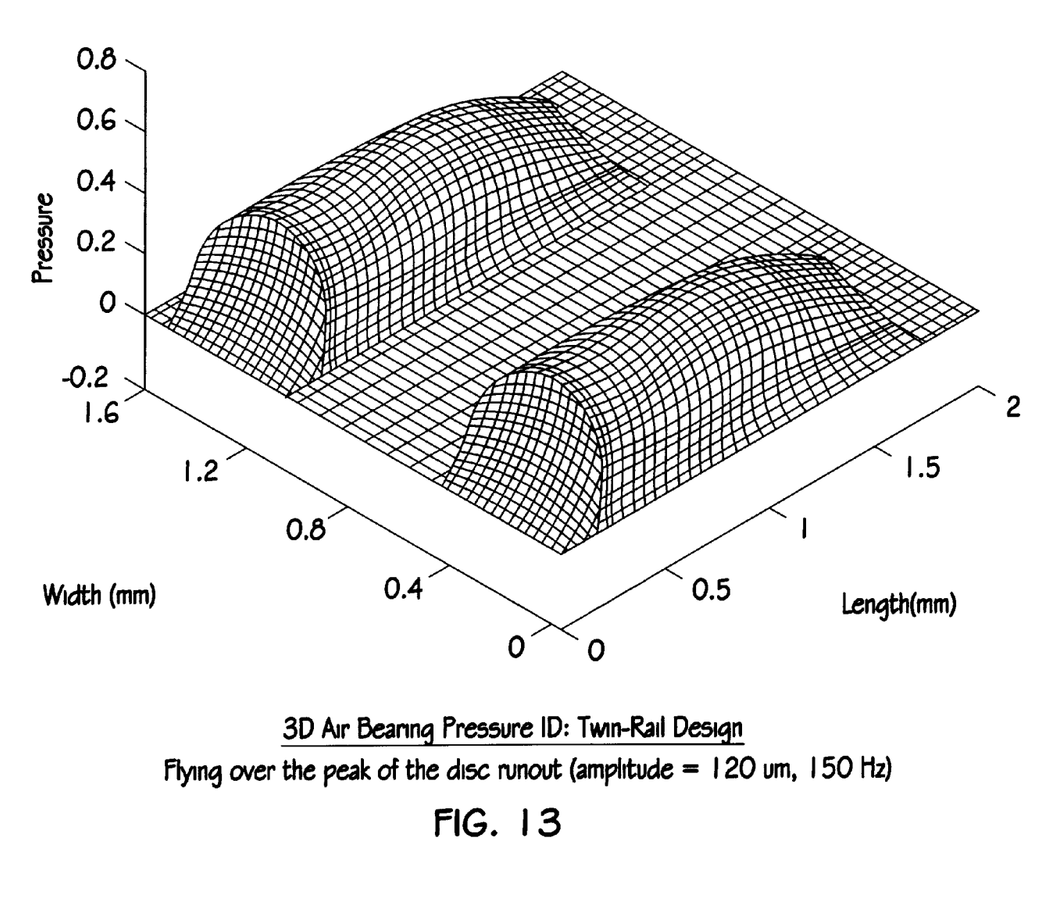

The remaining figures, FIGS. 10–15, illustrate the simulated flying characteristics of the cross-cut slider of the present invention as it is flown over a disc runout surface where the runout frequency is varied from 75 Hz (1 wave per revolution) to 225 Hz (3 waves per revolution) and the peak-to-peak amplitude is varied from zero to 200 micron meters. FIG. 10 shows the effects of runout on minimum fly height. Comparing the cross-cut design shown by the solid lines with the twin rail design shown by the dotted lines with the resulting improvement in fly height stability being evident. FIG. 11 shows the effects of disc runout on fly height modulation with the cross-cut design being represented by the solid lines, again showing improvement in every example.

Figure 14:
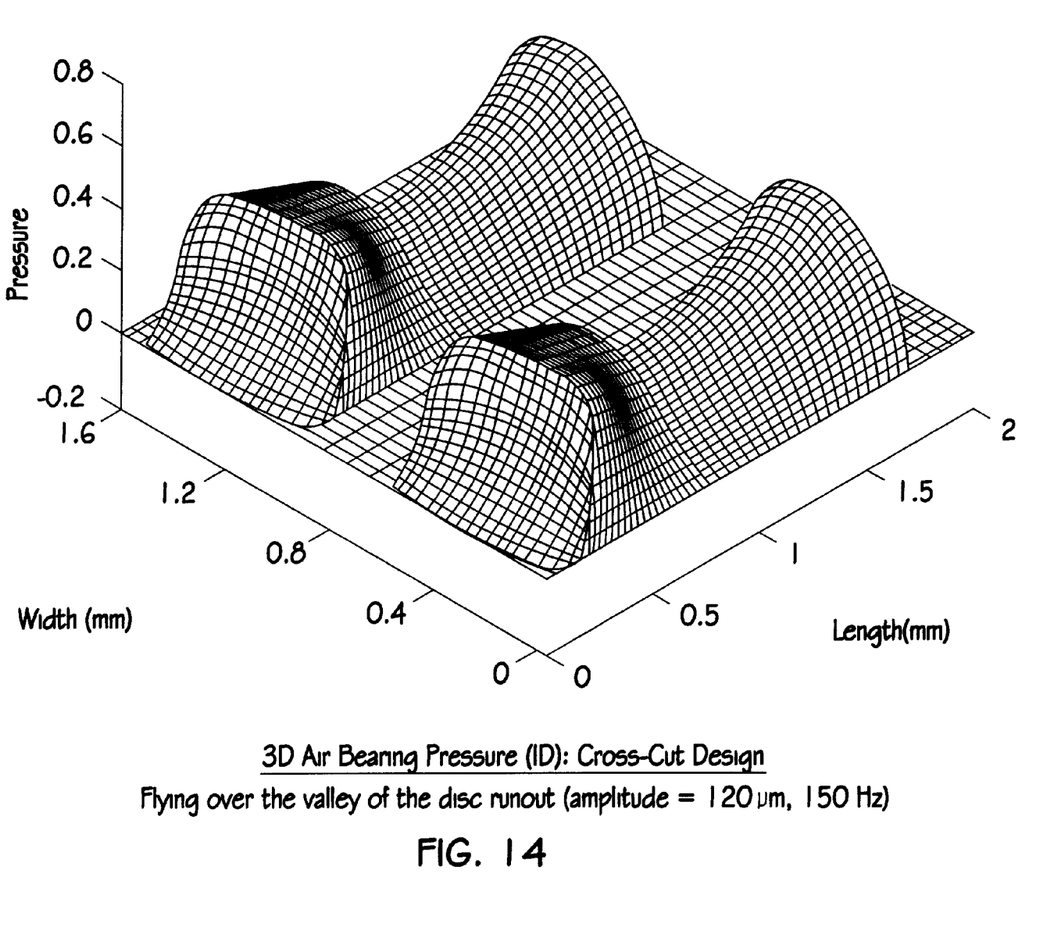
FIGS. 14 and 15 are air bearing pressure profiles for the glide head of the present invention as the head flies over the valley (FIG. 14) and the peak (FIG. 15) of the disc runout with an amplitude of 120 micron meters and a frequency of 150 Hz.
Figure 15:
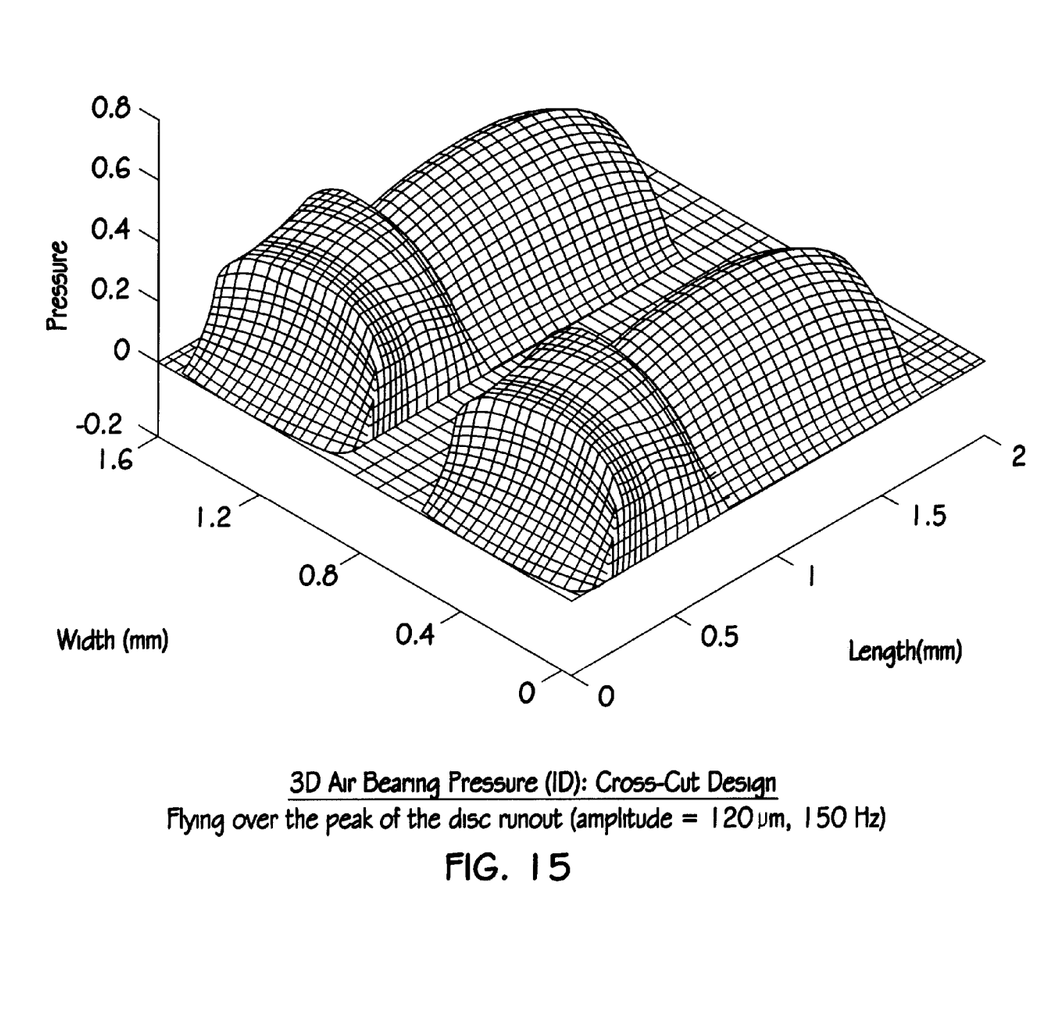

FIGS. 12, 13, 14, and 15 illustrate the air bearing pressure, both for the twin rail design (FIGS. 12 and 13) and the cross-cut design (FIGS. 14 and 15). As previously discussed, the problem which this design solves is the altering crown effects on slider motion causing the gap between slider and disc to be constantly changing in the twin rail designs. Negative crown (flying over the valley region) discourages pressure generation, decreasing fly height and causing the glide head or slider to sink closer to the disc while positive crown, which occurs when flying over the peak region, encourages pressure generation increasing the fly height. Thus, comparing FIGS. 12 and 13 with their dramatic differences in the pressure profile under the two rails of the design with FIGS. 14 and 15 which show that whether flying over a valley or a peak with the crosscut design, little change in the pressure distribution under the pads occur.

Thus, the diminishing of fly height modulation by the present invention is dramatically achieved by the present invention.

Alternatives to the present design may occur to a person of skill in the art who studies the present invention disclosure. Therefore, the scope of the present invention is to be limited only by the following claims.

What is claimed is:

1. An air bearing slider configuration for glide testing of MO plastic media with a relatively flat and unmodulated fly height profile over the surface of a disc, wherein the slider has a leading edge and a trailing edge relative to a track on a surface of the disc and comprises slider pads arranged to effectively form first and second rails extending between said leading edge and said trailing edge, the space between the rails being open and narrower than either of the rails, each of said rails comprising a first leading slider pad and a second, trailing slider pad, said first and second pads being separated by a gap cut through to a bottom surface of the slider to diminish the crown effects and stabilize fly height over the disc surface, wherein said space between the rails is substantially uniform and extends substantially from said leading edge to said trailing edge.

2. A slider as claimed in claim 1 wherein a leading edge of said leading slider pad is tapered to aid said slider in flying over said disc surface.

3. A slider as claimed in claim 1 wherein each of said pads is about 0.7 mm in length, and said gap is about 6 mils.

4. A slider as claimed in claim 3 wherein each of said pads is about 0.6 mm wide.

5. A slider as claimed in claim 4 wherein said rails are separated by a gap of about 10 mils.

6. A magneto-optical recording system comprising at least one disc supported for rotation, an actuator arm supported for rotation about a pivot adjacent said disc, and arm supporting at least a part of a voice coil motor on an end of said arm distal from said disc and a transducer carried on a slider to move from track to track over a surface of said disc, said slider having a relatively flat and unmodulated fly height profile over the surface of a disc, wherein the slider has a leading edge and a trailing edge relative to the track and comprises slider pads arranged to effectively form first and second rails extending between said leading edge and said trailing edge, the space between the rails being open and narrower than either of the rails, each of said rails comprising a first leading slider pad and a second, trailing slider pad, said first and second pads being separated by a gap cut through to a bottom surface of the slider to diminish the crown effects and stabilize fly height over the disc surface, wherein said space between the rails is substantially uniform and extends substantially from said leading edge to said trailing edge.

7. In a system as claimed in claim 6, a leading edge of said leading slider pad of the slider is tapered to aid said slider in flying over said disc surface.

8. In a system as claimed in claim 6, each of said pads of the slider is about 0.7 mm in length, and said gap is about 6 mils.

9. In a system as claimed in claim 8, each of said pads of the slider is about 0.6 mm wide.

10. In a system as claimed in claim 6 wherein said rails of the slider are separated by a gap of about 10 mils.

11. In a system as claimed in claim 6 wherein said pads of the slider are about equal in length along a long axis of said slider.

12. A magneto-optical recording system comprising at least one disc supported for rotation, an actuator arm supported for rotation about a pivot adjacent said disc, and arm supporting at least a part of a voice coil motor on an end of said arm distal from said disc and a transducer carried on a slider to move from track to track over a surface of said disc, said slider having means for diminishing the crown effect and stabilize the fly height over the disc surface including first and second rails supporting said slider to fly over a surface of said disc, the space between the rails being open and narrower than either of the rails, wherein said space between the rails defines said rails and is substantially uniform and extends substantially from said leading edge to said trailing edge.

* * * * *